United States Patent [19]

Brian et al.

[11] Patent Number: 5,275,371
[45] Date of Patent: Jan. 4, 1994

[54] ABSORBER TUNING BLOCK RETAINER APPARATUS

[75] Inventors: Michael Brian, Garland; Larry D. McPherson; William F. Weber, both of Allen, all of Tex.

[73] Assignee: Alcatel Network Systems, Inc., Richardson, Tex.

[21] Appl. No.: 823,947

[22] Filed: Jan. 22, 1992

[51] Int. Cl.$^5$ ............................................. F16M 13/00
[52] U.S. Cl. ................................... 248/618; 267/158; 174/52.1; 248/632; 248/638; 248/626
[58] Field of Search ............... 248/618, 632, 638, 626; 267/158, 160, 164; 174/52.1

[56] References Cited

U.S. PATENT DOCUMENTS

| | | | |
|---|---|---|---|
| 3,500,977 | 3/1970 | Gehrke | 267/164 X |
| 3,650,520 | 3/1972 | Vernon et al. | 267/152 |
| 4,190,227 | 2/1980 | Belfield et al. | 248/618 X |
| 4,607,492 | 8/1986 | Demus et al. | 267/160 X |
| 4,740,057 | 4/1988 | Dezso | 267/160 X |
| 4,942,075 | 7/1990 | Hartel et al. | 248/632 X |
| 5,102,107 | 4/1992 | Simon et al. | 267/152 |
| 5,178,357 | 1/1993 | Platus | 248/638 X |

*Primary Examiner*—Blair M. Johnson
*Attorney, Agent, or Firm*—Bruce C. Lutz; Dennis O. Kraft

[57] ABSTRACT

A springy, low dielectric retainer device in the form of a rod, a triangle, an ellipse or whatever, is used in a compressed condition to hold RF energy absorber blocks in position juxtaposed "energy leaky" RF circuitry. The absorber blocks are held in position due to frictional forces provided by the compressed retainer. In this manner, the absorber blocks can be re-positioned to obtain optimum amplitude/frequency response characteristics from the affected RF circuit.

8 Claims, 2 Drawing Sheets

ABSORBER TUNING BLOCK RETAINER APPARATUS

The present invention is generally related to RF circuitry and more specifically, to preventing oscillations in high gain RF circuitry through the use of RF energy absorber blocks and even more specifically, to the means for holding said absorber blocks in position while easily allowing re-positioning for optimization.

BACKGROUND

It has been found that high frequency circuits "leak" RF energy. The FCC has required that this leakage be kept below certain standards. Since the FCC made requirements put rules in place aimed to prevent the leakage, radio frequency circuits are typically enclosed in a metal container. When the enclosure cover is off while the circuits are being optimized in their performance, the RF energy escapes to the outside. It has been found that when a cover is placed on the enclosure, and the RF energy can no longer escape to the atmosphere, that it may be reflected to sensitive portions of the circuit in a positive feedback manner, and conversely may cause oscillations or other detrimental effects. Thus, it is important in high gain circuits that some type of RF energy absorption material be used to minimize reflective energy. The use of RF energy absorber blocks adjacent such energy emitting circuitry is one such solution to minimize reflective energy.

When a high gain amplifier capable of passing high frequency radio signals is placed in an enclosed environment, standing waves of other detrimental effects are sometimes initiated such that the amplifier will oscillate. Thus, while the amplitude/frequency response of the circuit may be satisfactory after adjustment of various parameters with the cover of the enclsure off, the amplifier may break into oscillation upon complete enclosure of a circuit by fastening down the cover. RF energy absorber blocks can be positioned adjacent the RF circuitry to minimize adverse results upon encosing the RF circuitry.

In the past, the absorber blocks have been held in place by various means such as a screw-type rod with nuts used to hold the absorber blocks in place against the wall until the optimum placement is determined. Upon proper placement, the absorber blocks are often epoxied or otherwise permanently attached to the walls. If the screw rod is made of metal, as has been the case in the past, and the parts accidentally fall onto the microwave circuit during the positioning process, the adjacent microwave circuitry can be damaged mechanically and/or electrically.

The present invention improves upon the prior art referenced above by making the retainer device out of a low dielectric material such as nylon or delrin. If the metal screw were merely made out of one of these materials, the potential for damage from dropping it would be minimized both electrically and mechanically. However, the screw-type device is still awkward to install and to adjust for block re-positioning purposes.

The present concept uses deformation of a portion of a retaining device to provide sufficient forces between the absorber blocks and the walls to hold these blocks in position long enough to accurately ascertain block position for optimum circuit performance characteristics. Properly positioned blocks can then be epoxied or otherwise adhesively attached to the walls. While the present retaining device could be removed at this time, it is typically left in place for potential future use if the circuit board needs replacing in the field.

It is an object of the present invention to provide an improved absorber block retainer.

Other objects and advantages of the present invention will be apparent from a reading of the specification and appended claims in conjunction with the drawings wherein:

Figure 3:
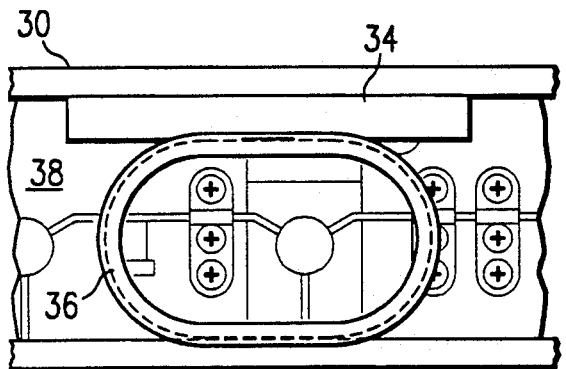
Figure 4:
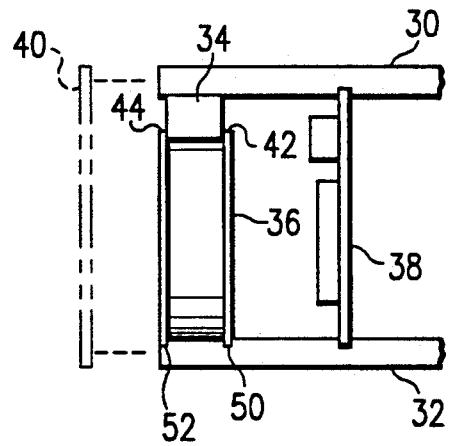
Figure 5:
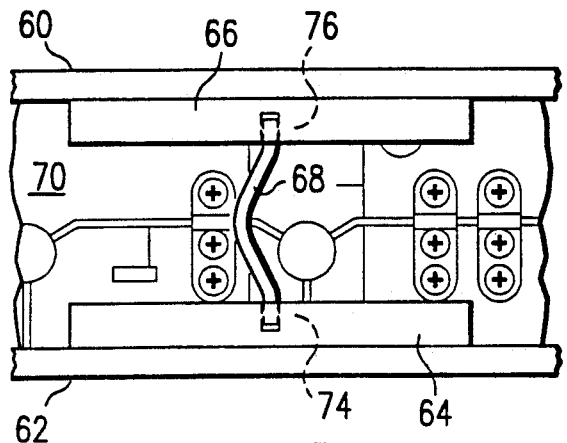
Figure 6:
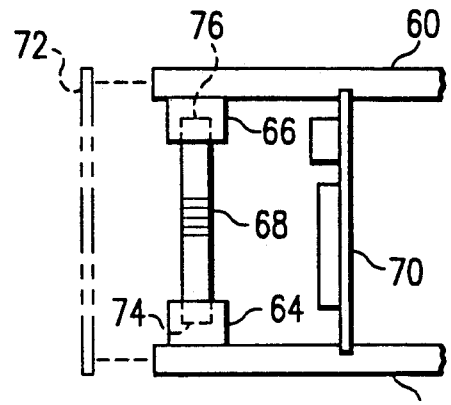
Figure 7:
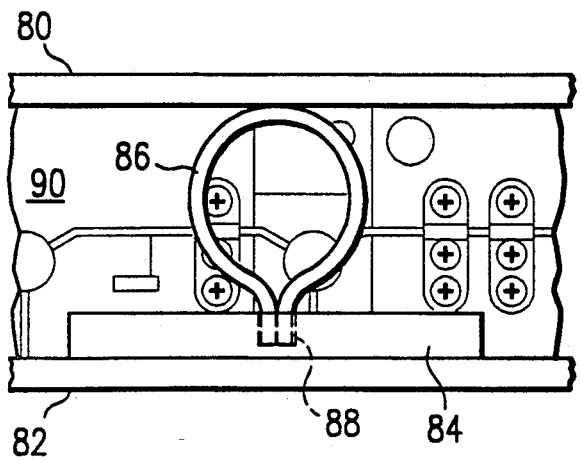
Figure 8:
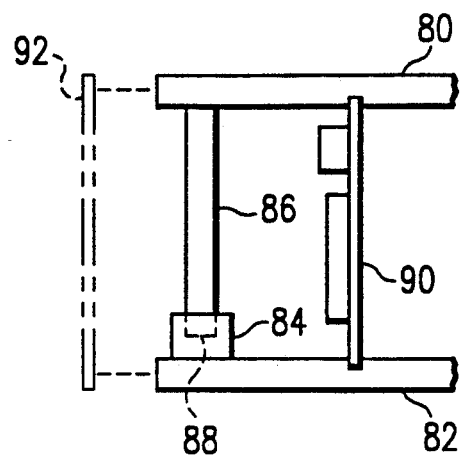
Figure 9:
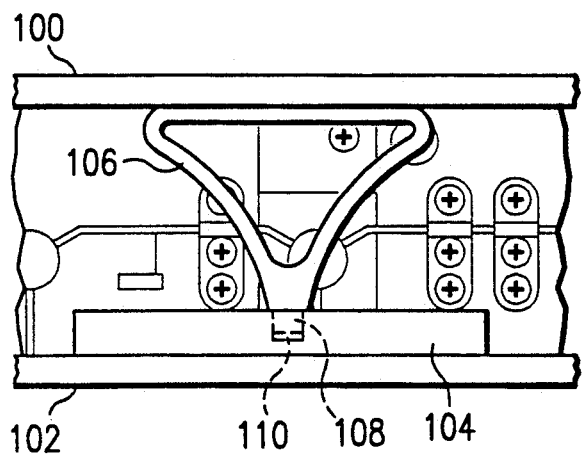

FIG. 3 in plan view illustrates an ellipsoid retainer using channels to prevent dislocation between the retainer and an absorber block;

FIG. 4 is an elevation view of FIG. 3;

FIG. 5 in plan view illustrates a retainer in the form of a flexed or bent rod holding absorber blocks on either side of enclosure walls;

FIG. 6 is an elevation view of FIG. 5;

FIG. 7 is a plan view of a rod of spring-type material in the form of a loop holding a single absorber block against one wall of an enclosure;

FIG. 8 is an elevation view of FIG. 7;

FIG. 9 is a plan view of a triangular-shaped retaining device; and

Figure 10:
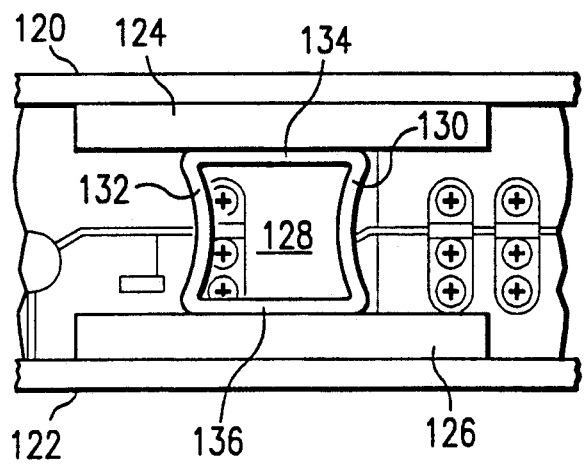

FIG. 10 is a plan view of a substantially rectangular-shaped retaining device.

DETAILED DESCRIPTION

Figure 1:
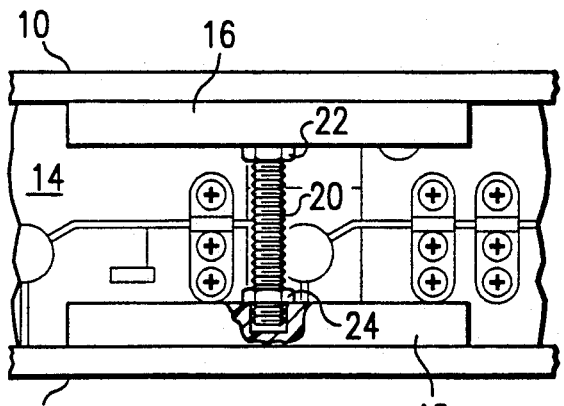
FIG. 1 is a plan view of a prior art solution to retaining absorber blocks.

In FIG. 1 walls 10 and 12 of an enclosure are shown in a plan view. This view includes a printed circuit board 14. Absorber blocks 16 and 18 are also shown with a screw-type rod 20 having nuts 22 and 24.

Figure 2:
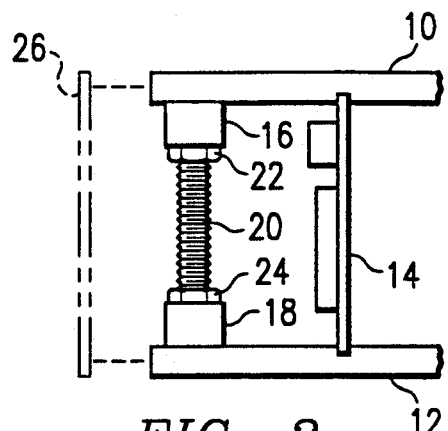
FIG. 2 is an elevation view of FIG. 1.

FIG. 2 illustrates an end or elevation view of FIG. 1 with the addition of a dash line cover 26. FIG. 2 that there are components on the surface of board 14. The cover 26 is used to contain RF energy within the enclosure defined by walls 10 and 12. Coverage of the other end of the enclosure is not specifically shown.

FIG. 3 shows walls 30 and 32 along with absorber block 34 and an elliptical ring 36.

FIG. 4 uses the same designations as shown in FIG. 3 with the addition of 38 for the microwave circuit board and 40 for a cover. It will also be noted from the elevation view that the ellipsoid retainer 36 is grooved where flanges 42 and 44 partially enclose absorber block 34. The flanges 42 and 44 fit within grooves 50 and 52 on wall 32 to prevent movement with respect to the wall 32. While the flanges may not be necessary to frictionally hold the retainer 36 and the absorber block 34 in place for initial positioning or re-positioning, they do facilitate maintaining a desired distance from board 38.

In FIG. 5 walls 60 and 62 are shown with absorber block 64 and 66 and a rod 68 of springy-type low dielectric material such as delrin or nylon.

FIG. 6 uses the same designators as FIG. 5 with the addition of a circuit board 70 and a dash line cover 72. It will be noted that there are illustrated openings 74 and 76 in the absorber blocks 64 and 66 respectively, to more readily keep the rod 68 from becoming dislocated while the blocks 64 and 66 are being re-positioned for optimum circuit performance.

In FIG. 7 walls 80 and 82 are illustrated with an absorber block 84 and a retainer 86 in the form of a rod of material which is looped in the form of a hairpin or U-shaped and both ends inserted in a cavity or opening 88 within absorber block 84.

FIG. 8 uses the same designations as in FIG. 7 with the addition of 90 for the printed circuit board and 92 for a dash line cover.

FIG. 9 shows walls 100 and 102 with an absorber block 104 and a triangular-shaped retainer 106. A teat or extension 108 on retainer 106 is positioned within a cavity or opening 110 in absorber block 104.

FIG. 10 shows walls 120 and 122 with absorber blocks 124 and 126 and a retainer generally designated as 128 having side walls 130 and 132 and further walls 134 and 136.

Retainer 36 in FIGS. 3 and 4, retainer 68 in FIGS. 5 and 6, retainer 86 in FIGS. 7 and 8, retainer 106 in FIG. 9, and retainer 128 in FIG. 10 are all made of springy-type low dielectric material such as delrin or nylon.

It will be noted that all embodiments of the inventive concept can be used with one or two absorber blocks, and while relative position holding devices such as teat 108 and flanges 44 and 42 have been used, friction will typically provide all the relative positioning required in most instances. However, the positioning devices have been illustrated as an enhancement that may be used where required or desired.

OPERATION

While it is believed that the operation of the present invention should be obvious from the drawings and previous description, a summary of operation of the Figures will be provided. The prior art approach shown in FIG. 1 was to insert the ends of the screw 20 in the openings within the absorber blocks 16 and 18 and slide the combination or package into place. The nuts 22 and 24 were then rotated to provide forceful contact with the absorber plates or blocks 16 and 18 so as to exert forces on the walls 10 and 12 via the absorber blocks 16 and 18. At least one of the nuts 22 and 24 needed to be loosened to attempt re-positioning of the blocks during the determination of signal bandwidth and amplitude response testing. At times, this could cause the parts to fall either due to slippage of one of the blocks vertically or due to inadequate attention being taken as to whether ends of screw 20 were maintained in the opening of each of the absorber blocks 16 and 18.

As mentioned previously, the flanges 42 and 44 of retainer device 36 in FIGS. 3 and 4 would not be required in all embodiments. Without the existence of the flanges, there would be some possibility of the relative position of absorber block 34 and ellipsoid 36 not being maintained. Further, the absorber block 34 may not be maintained the right distance vertically with respect to board 38. With the flanges 42 and 44 it would be easier to maintain such a distance and would minimize the chances that the absorber block 34 can move and/or fall with respect to the retainer 36. While FIG. 3 and some of the following FIGS. such as 7 and 10 also show only a single absorber block, the concept can easily be used with two absorber blocks in all instances.

FIG. 5 illustrates a rod 68 of springy, substantially RF transparent or low dielectric material which is deformed to a compressed mode as shown when the absorber block 64 and 66 are placed close enough together to fit between walls 60 and 62. The openings 74 and 76 within absorber blocks 64 and 66, respectively, prevent the rod 68 from falling out. However, the friction with some types of materials would be sufficient to prevent slippage and the openings 74 and 76 would not be required in all instances using this embodiment of the concept. The concept of FIG. 5 could be used with a single absorber block by having a plurality of openings in wall 62 or having a slot with sufficiently close tolerances to keep the rod 68 from moving excessively.

The concept shown in FIG. 7 uses a single rod 86 of low dielectric material with one end placed in opening 88 and with the rod bent somewhat as shown so that the other end is also placed in opening 88. This gives a considerable amount of surface contact with wall 80 and thus, easily solves the problem of providing retention for a single absorber block. However, the concept of FIG. 7 can also easily be used with two absorber blocks and further, a protrusion could be provided at the middle point of rod 86 (in a manner similar to that used infra in FIG. 9) to be used as a positioning device with a second block.

The comment with respect to the positioning device of FIG. 7 is more clearly illustrated in FIG. 9 where a positioning extension or teat 108 is used to reduce the possibility of vertical movement of the retainer 106 with respect to absorber block 104. As will be noted, the walls of the triangular retainer device 106 have been flexed from their normal equilateral triangle configuration to a distorted triangle for providing the compressive and frictional forces to hold absorber block 104 in position against wall 102. Again, this concept can be used with either one or two absorber blocks and positioning devices such as 108 could be used within the middle of the opposing base of 106 if used with a second absorber block. Other approaches such as the flanges of FIG. 3 may also readily be used in connection with device 106.

Retainer device 128 in FIG. 10 illustrates that a normally substantially rectangular retainer device would have the walls 130 and 132 flexed upon compression to provide the forces to hold absorber blocks 124 and 126 in place. With the large surface area of sides 134 and 136 contacting absorber blocks 124 and 126, respectively, no positioning devices such as the extension 108 of FIG. 9 should be required. However, such could be utilized if deemed desirable.

While we have illustrated several different configurations of low dielectric retaining devices for practicing the inventive concept, we wish to be limited not to the specific embodiments illustrated, but only by the scope of the appended claims wherein we claim.

We claim:

1. Absorber block installation apparatus comprising, in combination:
   radio frequency (RF) energy absorber block including a positioning opening therein for insertion of holding apparatus; and
   low dielectric spring tool means, including at least one teat for insertion in said positioning opening of said absorber block, said tool means operable to frictionally hold said absorber block against one of two substantially parallel walls while said tool means is in a compressed state between said two substantially parallel walls.

2. Apparatus for variably positioning an RF signal absorber block adjacent RF circuitry comprising, in combination:
   at least one absorber block positioned on one of two opposing walls of a cavity adjacent an RF circuit, said absorber block including a female portion; and
   RF signal transmissible spring tool means, including a male portion interacting with said female portion of said absorber block, said tool means positioned intermediate said absorber block and a second of said two opposing walls of said cavity, said tool means being in a compressed state for frictionally holding said absorber block against said one of two opposing walls while in a compressed state and using said second of two opposing walls as a base.

3. Block retainer apparatus comprising, in combination:
absorber blocks positioned on opposing walls of a RF signal circuit enclosure, said absorber blocks each including a female portion; and
substantially RF transmissible spring tool means, including a male portion interacting with said female portion of at least one of said absorber blocks, positioned intermediate said absorber blocks, said tool means being in a compressed state for frictionally holding said absorber blocks against said opposing walls while in a compressed state and using the other of said opposing walls as a base.

4. Apparatus for variably positioning an RF signal absorber block adjacent RF circuitry comprising, in combination:
at least one absorber block positioned on one of two opposing walls of a cavity adjacent an RF circuit; and
RF signal transmissible spring tool means positioned intermediate said absorber block and a second of said two opposing walls of said cavity, said tool means being in a compressed state for frictionally holding said absorber block against one of said opposing walls while in a compressed state and using the other of said opposing walls as a base.

5. Apparatus as claimed in claim 2 where said tool means comprises a length of material flexed such that both ends are inserted in said female portion.

6. Apparatus as claimed in claims 2 or 4, wherein said tool means comprises a centrally open, shaped device having sidewalls that are flexed in said compressed state.

7. Apparatus for variably positioning an RF signal absorber block adjacent RF circuitry comprising, in combination:
at least one absorber block positioned on one of two opposing walls of a cavity adjacent an RF circuit, said absorber block including a female portion; and
RF signal transmissible triangular-shaped spring tool, including a male portion interacting with said female portion of said absorber block, said tool positioned intermediate said absorber block and a second of said two opposing walls of said cavity, said tool having sidewalls flexed in a compressed state for frictionally holding said absorber block against said one of two opposing walls while in a compressed state and using said second of two opposing walls as a base.

8. Apparatus for variably positioning an RF signal absorber block adjacent RF circuitry comprising, in combination:
at least one absorber block positioned on one of two opposing walls of a cavity adjacent an RF circuit; and
RF signal transmissible triangular-shaped spring tool positioned intermediate said absorber block and a second of said two opposing walls of said cavity, the sidewalls of said tool being flexed in a compressed state for frictionally holding said absorber block against one of said opposing walls while in a compressed state and using the other of said opposing walls as a base.

* * * * *